Patented Sept. 12, 1950

2,522,363

UNITED STATES PATENT OFFICE 2,522,363

PREPARATION OF ESTERS OF FUMARIC ACID

Emmett J. Glazer, Akron, Ohio, assignor to Wingfoot Corporation, Akron, Ohio, a corporation of Delaware No Drawing. Application March 13, 1946, Serial No. 654,217

4 Claims. (Cl. 260—485)

This invention relates to a new method of preparing the alkyl esters of fumaric acid and more particularly, to a method of converting maleic anhydride into fumaric acid esters.

Maleic anhydride is used as the raw material in the preparation of all derivatives of maleic and fumaric acids. Thus, it is well known that maleic acid can be isomerized to fumaric acid in the presence of various catalytic substances and the fumaric acid thus prepared is then esterified to form any desired fumarate. This known method of preparing esters of fumaric acid is objectionable because the relatively water-insoluble maleic anhydride must be reacted with water to form maleic acid before the isomerization step. The isomerization is usually conducted in aqueous solution and the resulting fumaric acid, which precipitates during the isomerization, is separated by filtration and then dried prior to the esterification. Even the esterification is not satisfactory because of the slow rate of reaction, the insolubility of fumaric acid and the necessity for removing two molecules of water per molecule of ester.

The fundamental purpose of this invention is to provide a simple and economical method of converting maleic anhydride to fumaric acid esters by first esterifying the maleic anhydrides and subsequently isomerizing the maleic acid esters to the fumarates. Since the usual catalysts for the isomerization of the acids are not effective in isomerizing the esters, a further purpose of this invention is to provide a catalyst for the isomerization of maleic acid esters.

The new method involves the conversion of maleic anhydride directly to the alkyl esters, thereby avoiding the necessity of a hydration reaction. This esterification requires only the removal of a single molecule of water for each molecule of maleic anhydride, as will be seen from the equation

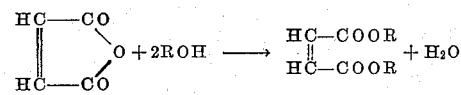

The isomerization of the ester is performed under anhydrous conditions and filtration and drying operations are unnecessary. Thus, a simple two-step method, esterification and isomerization, is used in place of the old five-step method, hydration, solution, isomerization, water separation, and esterification.

Catalysts customarily used in isomerizing maleic acid are frequently ineffective in isomerizing esters. Thus, potassium thiocyanate and other salts of thiocyanic acid, which are useful in converting maleic acid to fumaric acid at 120° C. have no effect on ethyl maleate even at temperatures of 140–160° C.

It has now been found that esters of maleic acid can readily be converted to the corresponding esters of fumaric acid by heating them in the presence of sulfur at temperatures in excess of 180° C. The sulfur used as a catalyst does not need to be exceptionally pure; any inexpensive commercial product, such as flowers of sulfur, may be used. The quantity of sulfur used in the practice of this invention may vary from a minute quantity, for example, 0.05 percent, to 10 percent or more by weight based on the ester, but generally quantities varying from 0.5 to 2 percent, and preferably 1 percent, are used.

The isomerization reaction is preferably conducted at temperatures in excess of 180° C. and frequently it is desirable to operate between 200° C. and the reflux temperature of the ester. At temperatures below 180° C. only a partial conversion to fumaric acid esters can be achieved, unless an unreasonably long reaction time is allowed.

Further details of the practice of this invention are set forth in the following examples:

Example 1

A 25 gram sample of diethyl maleate prepared by the esterification of maleic acid was mixed with 0.25 gram of sulfur and heated at 200° C. for one hour. At the time the temperature first reached 200° C., and at the end of each 20 minute period thereafter a small sample was removed for the purpose of determining the extent of conversion. Shortly after heating the mass up to 200° C., it was found that 2 percent of diethyl maleate had been converted to diethyl fumarate. After 20 minutes, 57 percent of diethyl fumarate was found to be present; after 40 minutes, 90 percent was found present and at the end of the hour, 93 percent of diethyl maleate had been converted to fumarate.

A control reaction was conducted, identical in every respect except that a reaction temperature of 160° C. was used, and only 2 percent of the diethyl maleate was isomerized at the end of an hour.

Example 2

Using a 4 gallon glass-lined reactor equipped with a stirring mechanism to facilitate the dispersion of the sulfur, a large scale preparation was made. Sixteen pounds of diethyl maleate and 0.16 pound of sulfur were charged and gradually heated to 200° C. while stirring the mass vigorously. The flask was then provided with a reflux condenser and the temperature raised to the boiling point. The reaction mass was maintained at the reflux temperature (220° C.) for one hour. The resulting product was cooled and then distilled at a pressure of 10 mm. A substantially pure diethyl fumarate was thereby obtained.

In addition to diethyl fumarate, other esters, including n-propyl, n-butyl and n-hexyl fumarates, have been prepared by isomerization of the corresponding maleic acid esters. This method may be used for the preparation of any alkyl ester of fumaric acid, including the esters of tertiary and secondary alcohols such as isopropyl and tertiary butyl alcohols.

Although the invention has been described with respect to specific examples, it is not intended that the details thereof shall be construed as limitations upon the scope of the invention except to the extent incorporated in the following claims.

I claim:

1. A method of preparing alkyl fumarates from maleic anhydride, which comprises esterifying the maleic anhydride by heating with an alkyl alcohol and subsequently isomerizing the resulting alkyl maleate to an alkyl fumarate by heating with commercial sulfur at a temperature above 180° C.

2. A method of preparing ethyl fumarate which comprises heating ethyl maleate at a temperature between 200° C. and the reflux temperature in the presence of elemental sulfur.

3. A method of preparing ethyl fumarates from maleic anhydride, which comprises esterifying the maleic anhydride by heating with ethyl alcohol and subsequently isomerizing the resulting ethyl maleate to an ethyl fumarate by heating at a temperature of about 200° C. in the presence of elemental sulfur.

4. In the method of preparing ethyl fumarates from maleic anhydride by esterification and subsequent isomerization, the step of conducting the isomerization in the presence of elemental sulfur at a temperature between 200° C. and the reflux temperature.

EMMETT J. GLAZER.

REFERENCES CITED

The following references are of record in the file of this patent:

UNITED STATES PATENTS

| Number | Name | Date |
|---|---|---|
| 2,404,103 | Scott | July 16, 1946 |

OTHER REFERENCES

Beilstein: "Hand. der Organ. Chem.," volume II (2nd suppl., 4th edition, page 632).

Meerwein et al.: "Berichte," volume 58, page 1267.

Clemo et al.: "Jour. Chem. Soc." (London), part I (1930), pages 213–215.